(No Model.)

F. W. KIMBALL.
GATE OPENING AND CLOSING ATTACHMENT.

No. 439,521. Patented Oct. 28, 1890.

WITNESSES:
N. R. Davis.
E. M. Clark

INVENTOR:
F. W. Kimball
Munn & Co.
ATTORNEYS

UNITED STATES PATENT OFFICE.

FRANK WARWICK KIMBALL, OF MILFORD, ILLINOIS, ASSIGNOR OF TWO-THIRDS TO HIRAM SCHAMBURG AND ISAAC C. WELCH, BOTH OF SAME PLACE.

GATE OPENING AND CLOSING ATTACHMENT.

SPECIFICATION forming part of Letters Patent No. 439,521, dated October 28, 1890.

Application filed July 19, 1890. Serial No. 359,325. (No model.)

*To all whom it may concern:*

Be it known that I, FRANK WARWICK KIMBALL, of Milford, in the county of Iroquois and State of Illinois, have invented a new and useful Improvement in Gate Opening and Closing Attachments, of which the following is a full, clear, and exact description.

This invention relates to means for opening and closing farm and other gates—as, for instance, by pulling on cords on approaching the gate and after passing through it—which may be operated from a vehicle without leaving it.

The invention consists in a novel attachment to or combination of mechanism with the gate, whereby the opening and closing of the gate is very perfectly accomplished and whereby the final opening and closing movements of the gate are controlled by spring-pressure, substantially as hereinafter described, and pointed out in the claims.

Reference is to be had to the accompanying drawings, forming a part of this specification, in which similar letters of reference indicate corresponding parts in all the figures.

Figure 1:
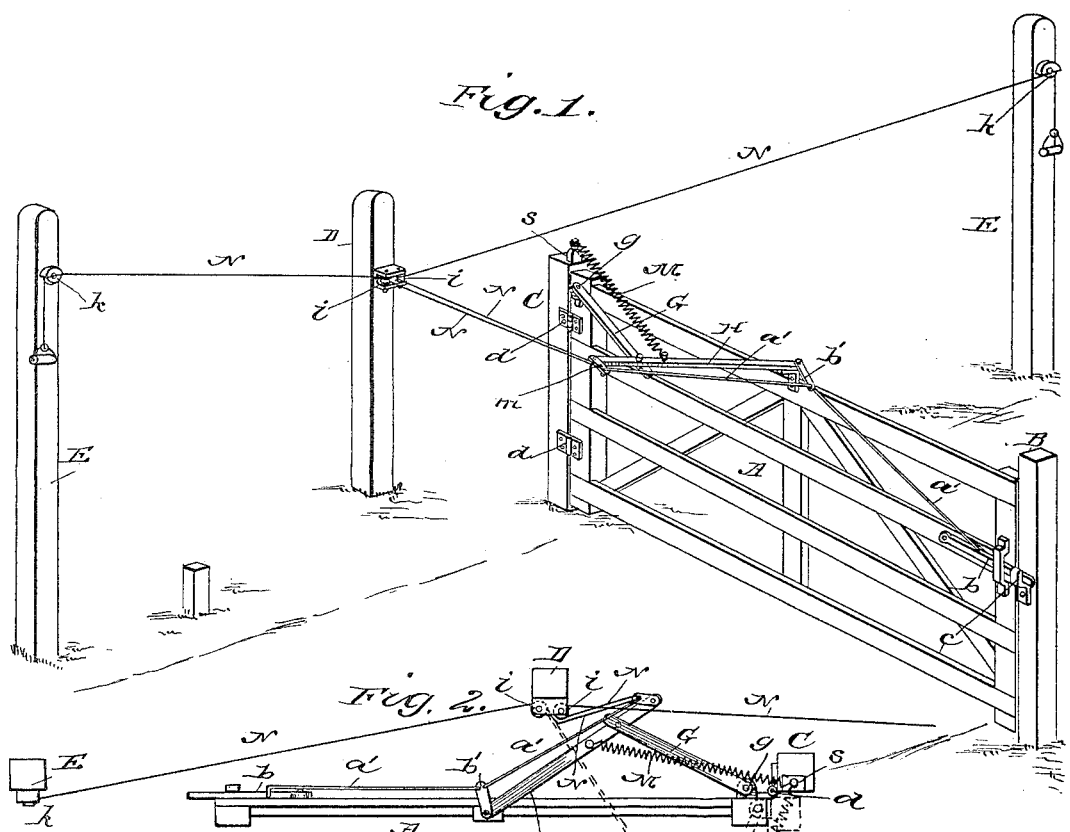
Figure 2:
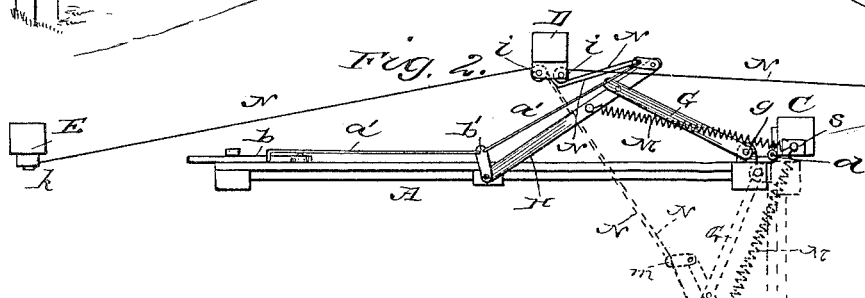
Figure 3:
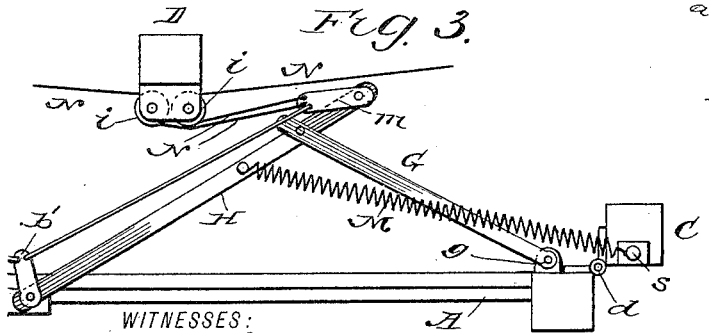

Figure 1 represents a view in perspective of a farm-gate in its closed position with the invention applied. Fig. 2 is a plan of the same, showing by full lines the parts in the position which they occupy when the gate is open and by dotted lines in the position they occupy when the gate is closed; and Fig. 3 is a plan view, upon a larger scale, mainly of the gate-opening devices in the same position which they occupy by full lines in Fig. 2.

A indicates a farm-gate, which may be of the usual or any suitable construction.

B is its front post, with which it is shown as latching, as by a latch $b$ and keeper $c$, and C is its back post, to which it is secured by hinges $d$. Said gate swings to open and close on one side only of said posts.

D and E E are supplementary posts or uprights arranged at distances apart along the hinge-post side of the gate, and the uses of which will be hereinafter explained.

Attached to one side of the gate, preferably at the top of the latter, is an arm G and brace H, projecting out from the gate in angular relation with each other, the arm G being secured to the rear portion of the gate and joining the brace H, which is attached at its other end to a forward or intermediate portion of the gate. Said arm and brace give the necessary leverage for operating the gate, and may be made longer or shorter to secure more or less lever-power as the size of the gate may require. The brace H is connected with the post C or upright arm $s$ thereon by a spring M, the use and operation of which will be hereinafter explained.

N N are two independent cords connected at their one end with the outer end of the brace H or with an extension $m$ therefrom, which cords after passing around pulleys $i\ i$ on the post D are continued in reverse directions, respectively, out to the posts or uprights E E, and there passed over pulleys $k\ k$. The uprights E E may be arranged at any convenient distance or place away from the gate on opposite sides of the latter. When a latch $b$ is used on the gate to fasten it when shut, then the outer end portion or extension $m$ of the brace H is pivoted or made yielding, and the same connected by link-rods $a'\ a'$, and an interposed crank-arm $b'$ on the gate with the latch $b$.

The gate is opened on approaching it from either side by pulling on the cord N at the post E on the side from which the gate is being approached. This pulls on the arm G and brace H, which combined virtually form a bracket. The first effect of the pull of the cord where a latch $b$ is used on the gate will be to lift the latch through the pivoted or yielding extension $m$ of the brace H and connections $a'\ b'\ a'$. The gate being thus unlatched, further or continued pull on the same cord N will operate to swing the gate partly open—that is, until the arm G is opposite or in line with the post D, or, rather, until the spring M, connected with the brace H, crosses the arm G and just crosses the point of connection $g$ of the arm G with the gate. Said spring, by its pull upon the brace H of the bracket H G, will then operate to complete the throwing of the gate open or back, as shown by full lines in Figs. 2 and 3, and will hold the gate open. The same action takes place for either cord N, according to which one is operated to open the gate from the side it is being approached. After passing through the gate the other cord N is pulled to start or partly close it, the closing being completed by the pull upon the brace H of the spring M as the latter passes to the other side of the connection $g$ or to the inner side of the arm G, and the gate will be held closed by the spring, as shown by full lines in Fig. 1 and dotted lines in Fig. 2. Thus the gate is held both open and closed even if the post B sag or be out of true. In some cases a latch for securing the gate might be dispensed with, in which case the cords N N might be directly connected with the brace H of bracket G H without the connection being a pivoted or yielding one, and the connections $a'$ $b'$ $a'$ be omitted.

Having thus fully described my invention, I claim as new, and desire to secure by Letters Patent—

1. In gate opening and closing attachments, the combination, with the gate and its front and back posts, of a lever bracket-like projection from the one side of the gate, cords connected with the same arranged to run in reverse direction to or beyond opposite sides of the gate and constituting pull devices for starting the gate in opening and closing it, and a spring connecting the bracket-like projection with the back or hinge-gate post and operating to complete the opening or closing of the gate, as set forth.

2. The combination of the gate A and its front and hinge posts B C, the bracket-like projection H G, the posts or uprights D E E, the cords N N, connected with said uprights and bracket-like projection H G, and the spring M, connecting the bracket-like projection H G with the hinge-post C, substantially as and for the purposes specified.

FRANK WARWICK KIMBALL.

Witnesses:
J. WOODWORTH,
M. Y. FOWLER.